2,956,035
BLOCK-RESISTING POLYETHYLENE FILM COMPOSITIONS

Henry W. Mock, Plainfield, N.J., assignor to Union Carbide Corporation, a corporation of New York No Drawing. Filed Aug. 21, 1957, Ser. No. 679,534

10 Claims. (Cl. 260—23)

This invention relates to improved polyethylene film-forming compositions. More particularly, it relates to a polyethylene composition which when formed into film shows improved resistance to blocking, and without adverse effect on clarity of the film.

The current trend in the polyethylene film field is towards clearer films which in turn has introduced very severe blocking problems. Blocking of polyethylene films is a more serious problem in the film field because of the wide usage of high clarity thin film materials, which are characterized by having low surface haze of 14% or less. Blocking was never a problem as long as the polyethylene films had surface haze values of 35% or more; but, as the surface haze was decreased through technicological advancement in resin manufacture, compounding of the resins, and film extrusion techniques, blocking tendencies of polyethylene films have increased. At first the blocking problems were confined at the film extrusion operation when the films had haze values in the range of 15% to 35%. Here, extruded tubular layflats would block at the inside surfaces.

As the film haze values were lowered into the range of 4% to 14%, the blocking problem extended to the rolls of sheet and layflat films at the extruder windups. The rolls would tend to block while in storage when subjected to temperatures of 105° F. to 120° F. or higher. The same low haze films would tend to block during converting operations and finally the problem reached the end user since the finish film item, such as printed produce bags, would be blocked at adjacent film layers. Blocking of films at any of the manufacturing levels, extruder, converter, or end user means poor handling or machinability processing characteristics.

Blocking can be defined simply as the tendency for film surfaces to adhere to each other or to resist separation, either due to molecular adhesion or vacuum between film layers. The latter in turn are worsened by smooth film surfaces as indicated by low haze readings. Low haze is characteristic of high clarity film while high haze is characteristic of poor clarity film due to microscopic roughness. This roughness tends to scatter light which causes poor clarity.

In practice, film layers are normally separated by a combination of sliding and lifting forces. The lifting component is resisted by blocking forces and the sliding component is resisted by frictional forces. Blocking can be measured as the perpendicular force required to separate one film layer from another. One convenient index of a film's slip is its kinetic coefficient of friction as determined by the stationary sled-sliding film method. The blocking and sliding or slip forces are theoretically at right angles to each other.

Blocking of film layers would manifest itself towards poor bag opening, or the film layers forming the bag may be blocked so severely that the bag is virtually impossible to open by the normal action of fingers. Such a bag would be useless in automatic or rapid, manual filling operations. At times the block between two adjacent film layers is so severe that the films appear as one solid piece. Film processing through machinery may be under high tension, which would lead to heat sealing difficulties, if the film were supplied from a pay-off roll which was blocked. Or if the film layers in the roll were blocked severly, pay-off action could actually come to a halt. A blocked tubular film layflat would be difficult to slit and rewind as single sheets, or if the layflat were converted directly into bags, the block would be incorporated in the finished bags. Such situations caused by blocking generally mean excessive waste of film, time, and low yield of finished goods. The above examples are meant to be only a partial listing of difficulties arising from polyethylene film blocking.

In the past, certain modifiers, which sweat-out or exude to the film surfaces, have been incorporated in polyethylene films. These agents or modifiers can attribute towards slip, anti-block, or both, but their effectiveness is limited to certain film processing conditions. These agents are relatively low melting and prone to softening or spreading into a continuous uniform layer over a wide range of combinations of temperature, pressure, or dwell time. These agents act as anti-block agents as long as they remain microscopically, finely dispersed discrete particles on the film surfaces. Their effectiveness as anti-block agents is dependent also on surface roughness or the haze value of the film. The sweat-out or exrudate agents are mostly effective when the film haze is 15% or greater, mainly because the film roughness keeps adjacent layers separated to prevent a solid block or seal from forming. The sweat-out agent when used in film with a haze value of 15% or greater acts only as a slip agent.

In the case where the film haze is 14% or less, the sweat-out agent is only effective as a slip and/or an anti-block agent is permitted to exude to the film surface and remain as finely discrete particles. The slip effect will not manifest itself on the inside surfaces of a tubular layflat of low haze values of 14% or less unless the layflat should be separated after once passing through the nip roll of a tubular extrusion process. This lack of sweat-out is due to the fact that the inside surfaces of the extruded layflat are pressed tightly together while passing through the nip leaving none or insufficient surface void space for the slip agent to exude. There can be no slip, let alone anti-block, effects if exudation does not take place. The exudation on the inside film surfaces during tubular film extrusion will become impossible when the surface haze is 14% or less and the temperature of the film entering the nip rolls is 105° F. or higher unless surface roughness is created without affecting clarity. Any sliding or slip action should not be misconstrued into meaning anti-block. Blocking can be measured only as a perpendicular force resisting separation of film surfaces. Furthermore, it has been found that sweat-out agents increase blocking tendencies of tubular layflats of low or high haze values by filling in any slight void space between the inside surfaces to create a more substantial vacuum-type block seal. Naturally, this is more detrimental to the films with haze value below 14%. Generally, bags made from layflat polyethylene film of high clarity, modified only with sweat-out agents, exhibit only poor to fair opening characteristics.

Also, in flat film extrusion of polyethylene resins, slip and anti-block agents of the sweat-out type are not effective at low concentrations from 0.1% or less because of the rapid quenching rate in this extrusion process. The rapid quench hinders sweat-out in such a manner that the agents are absorbed in the film. This is probably due to the particular crystalline structure formed in the film. Higher concentrations of sweat-out agents in flat film would lead to water carryover from the quenching bath or treatability for print or print adhesion difficulties as the film ages. This lack of sweat-out from flat films becomes a greater problem as the film haze decreases.

Also, low haze films of 14% or less modified with sweat-out agents only tend to block when subjected to storage temperatures of 100° F. to 120° F. or higher. The same films tend to exudate from film surfaces when being processed through converting machinery, treaters for print, and printing presses. The sweat-out agent is either absorbed in the film, volatilized, or rubbed of. Therefore, their slip and anti-block actions are not stable through all stages or levels of the polyethylene field.

It is, therefore, an object of the present invention to provide a polyethylene film-forming composition made from a high clarity resin which will exhibit good antiblocking features when formed into thin self-sustaining films.

It is a further object of the present invention to provide a polyethylene film of high clarity which will exhibit good anti-blocking characteristics.

According to the present invention, a new modifier system has now been discovered for improving the blocking resistance of high clarity polyethylene films, particularly those having a haze value of less than 15%. The improved composition of this invention includes in combination a base polyethylene resin suitable for forming thin self-sustaining polyethylene films, a slip agent, an antioxidant for polyethylene, an inorganic siliceous material, a high melting point wax which exudes to the surface of polyethylene film at room temperature and a polymeric hydrocarbon having different flow or freeze characteristics than the base resin. These materials in combination have been found necessary to give effective blocking resistance and slip in extruded films without degrading the optical properties of the film.

In addition to providing greater blocking resistance, this combination of materials has surprisingly been found to provide a more stable coefficient of friction, increased stiffness of thin films, higher shock impact strength and lower moisture and gas permeabilities. Also, I have found that with such film grade resins containing this modifying system, greater rates of extrusion are possible. All of these benefits have been achieved without degrading the optical properties and clarity of the polyethylene film.

This composition can be prepared from any of the standard film grade polyethylene resins, having melt indices from about 0.5 to about 12. It is particularly adaptable to those resins possessing a high degree of film clarity commonly employed for packaging and wrapping applications.

The slip agent employed in the composition of this invention must be an oily liquid or soft pasty solid which will sweat-out to film surfaces at room temperatures. It should have a melting point within the range of 20° C. to 75° C. and a boiling point of at least 225° C., should be readily dispersible in polyethylene and above all must be capable of reducing the coefficient of friction of the films. Such material as can be employed for this purpose include the amides of higher fatty acids, such as those containing between 18 and 22, inclusive, carbon atoms. Most desirable of these are the amides of oleic and erucic acids. In the film-forming compositions found to possess these unusual properties, the slip agent should be present in amounts between 0.001 and 0.15 part by weight per 100 parts of the composition. Preferably, however, amounts of between about 0.005 and 0.10 part by weight per 100 parts of composition are employed to give the best results in slip characteristics. As an example of its effect, I have found that amounts of the slip agent of about 0.03 part by weight per 100 parts of composition can reduce the coefficient of friction of polyethylene film from 0.60 to 0.20 or less.

A further necessary component of the film grade resin is a high melting point wax which while being a normally solid material at room temperatures, will nevertheless exude to the surface and sweat-out at temperatures below about 70° C. I have found that waxes melting between about 90° C. to 150° C. and having a boiling point of at least 225° C. will accomplish this purpose suitably. It need not, however, have any critical effect upon the coefficient of friction of the film but must necessarily blend readily and uniformly in the polyethylene. Such waxy agents as the amides of saturated fatty acids having from about 10 to 22 carbon atoms, and preferably from about 16 to 22 carbon atoms can be employed. Particularly desirable of these materials is palmitamide and stearamide.

These waxy materials can be employed in amounts between about 0.001 part to 0.15 part by weight per 100 parts of polyethylene composition, and more generally amounts between about 0.005 to 0.10 part by weight per 100 parts are best suited for most film applications. It is particularly desirable to employ this agent in amounts about equivalent to the slip agent employed, and with a total amount of both components not exceeding about 0.15 part by weight per 100 parts of the composition.

The antioxidant employed in the film-forming polymer can vary in amounts from about 0.001 part to as much as 1.0 part by weight per 100 parts of composition without significant effect upon the clarity of the film produced. Preferably, the antioxidant should be employed in amounts of from about 0.002 to about 0.3 part by weight per 100 parts of composition. Such amounts have been found to be very satisfactory to prevent oxidative degradation of film during its normal service life. Any of the normal antioxidants for polyethylene can be employed in the composition of this invention. Agents which can be used are typified by such materials as di-tert-butyl-p-cresol, di-tert-butyl-4-methoxyphenol, and N, N'-diphenyl-p-phenylenediamine, and 4,4'-thiobis(6-tert-butyl-m-cresol).

A fourth component necessary in this composition is a finely divided siliceous matter which has surprisingly been found to greatly affect the anti-blocking characteristics of the film and equally surprising, does not significantly affect the clarity of the film. However, such inorganic matter must be finely divided, i.e., with an average particle size between about 0.5 to about 7 microns. Such finely divided siliceous materials as can be used include diatomaceous earth, commercial silicas and silica gels having particle size distributions in this range. The smaller size particles are particularly adaptable to very thin film, such as about 0.5 mil film, although the larger size particles give better anti-block features than do the extremely fine size. For most general applications, a material having a particle size ranging from 2 to 4 microns is preferred.

The siliceous material should be employed in the composition in amounts between about 0.01 to 0.50 part by weight per 100 parts of composition, and preferably in amounts between about 0.03 to 0.20 part by weight per 100 parts of resin for extremely clear film. In amounts of over 0.2, some slight effect on haze is occasioned, which in very high clarity film might be undesirable, but with film having a slight natural haze would not be objectionable.

The final critical component necessary in this composition is an ethylene polymer having different flow or freezing characteristics than the base resin. It may, for instance, be the same resin as the base resin but being thermally or mechanically degraded to a polymer of different and higher melt index, or it may be an entirely different polymer of different melt index and different density than the base resin. For equivalent density base resins, the melt index of this polymeric component must be higher than the base resin and can range between about 1.0 and 50 but always at least 10 percent higher than the melt index of the base resin. In the higher melt index base resins, such as those between 6 and 12, an even larger differential in melt index is preferred. Equivalent results can also be secured by employing a higher density polymer than the base resin, although of the same or similar melt index. This essentially changes the freezing characteristics of the polymeric component. This polymer component is preferably employed in amounts of from 1 to 5 parts by weight per 100 parts of composition although, if desired, as much as 10.0 parts or as little as 0.5 part can be employed. If desired, this polymeric component can be mixtures or blends of polyethylene polymers to secure the different melt flow characteristics or densities.

One of the particularly desirable embodiments of this invention is to use as this polymeric component the same base resin but to mechanically degrade the resin by working the polymer in a high shear apparatus, such as a Banbury mill, differential 2-roll mill, screw extruder or the like. Generally, three to five minutes' milling or mechanical working in a Banbury mill is sufficient to change the melt index and flow characteristics of the polymeric component so as to be useful in the composition of the invention. Thus in this embodiment, the polymeric component and the other ingredients can be mixed in the Banbury while the polymer is being worked to secure a masterbatch of the modifying components for later incorporating and dispersion into the polyethylene base resin.

The modifier masterbatch composite of active agents simplifies manufacturing procedures when producing a finished compound. Instead of charging several individual agents into compounding equipment, it is only necessary to meter a base resin and the masterbatch into a mixing unit to form a finished product. Also, several of the active agents, introduced through the masterbatch, in the finished compound are at very small concentrations (0.012%–0.120%). It is difficult to control the high degree of metering accuracy required for these very effective agents, if the agents should be charged directly into a base resin. The individual concentrations of each active agent can be accurately controlled with a simple procedure and with ordinary weighing instruments by forming a masterbatch composite of these very effective agents in a resin. This in essence dilutes the very effective agents so that when the masterbatch is metered into the base resin the concentration of the very effective agents is accurately controlled. Gross hand weighings are only required of each agent before charging to form the masterbatch composite. Several batches of masterbatch would suffice for numerous batches of finished product where the masterbatch is added in amounts of about 1 to 5 percent.

The masterbatch composite of these agents increases the effectiveness of blocking resistance and slip characteristics as compared to charging the individual agents directly into the base resin at equivalent concentrations. The agents are more thoroughly dispersed and ground by first forming the masterbatch composite which accounts for the more effective results. Also, the introduction of the agents via a masterbatch decreases discoloration, increases extrudability and drawdown, increases shock impact strength, and improves optical properties of the finished compound as compared to direct addition of the agents into the base resin.

Masterbatch mixed compositions yield extruded films with excellent blocking resistance and slip and are highly uniform and reproducible in this respect. The greater blocking resistance of the extruded films permits higher tubular extrusion rates, i.e. more pounds/hour and higher linear f.p.m. rate, without additional cooling and without the layflat being tightly blocked or sealed. The films improve in blocking resistance and ease of bag opening upon aging while the reverse is true of previous compounds without anti-block modification.

The slip characteristics of the extruded films are far more stable over a wider range of extrusion temperatures, quenching rates, and treating conditions. Flame or electrostatic treatment on aged film changes the coefficient of friction only 0.15 unit. Prior type films changed 0.30 to 0.40 unit. The slip of these films will also be at a good level, having a coefficient of friction of about 0.25–0.40, over a wider range of extrusion conditions and film gauges than was possible before. This means the slip level will not be excessive, i.e. coefficient of friction less than 0.20 as found with prior formulations under similar processing conditions.

Greater stiffness than has been attainable heretofore can be achieved by extruding and drawing at lower temperatures than were previously practicable. Also, greater stiffness is achieved since the modifiers slightly increase the density of the base resin when forming the compound. Depending on the amount of modifiers incorporated, a slight increase in film density, of say 0.9230 to 0.9235 gm./cc. has been found to decrease gas, moisture vapor, and grease permeabilities by as much as 10% or more.

Surfaces of films produced from these compositions do not accumulate electrostatic charges as readily as unmodified films and hence they do not accumulate as much dust. This also serves to improve mainpulation during subsequent processing and fabrication operations. Heat sealability of these films is about the same as unmodified films. Response to flame or electrical bombardment treatment for improved print adhesion are about the same. Odor is distinctly improved, and the tendency to develop unpleasant odor on storage or heating is greatly reduced.

The following examples are illustrative.

*Example I*

A masterbatch mixture for preparing the polyethylene composition for film extrusion was made employing in parts by weight: 86 parts of a high clarity polyethylene resin with a density of 0.923 and a melt index of about 2.0, 1 part of di-tert-butyl-p-cresol, 10 parts of diatomaceous earth (sold by the name of Superfloss by Johns Manville Co.), 1.5 parts of oleamide, and 1.5 parts of a 70:30 mixture of stearic acid amide and palmitic acid amide, respectively. The polyethylene and the di-tert-butyl-p-cresol were first fluxed in a 3A Banbury mixer with 100 p.s.i. steam in the rotor and jacket and a ram pressure of 60 p.s.i. The remaining material was then added and fluxing was continued until a batch temperature of 120°–130° C. was secured. Total cycle time was 5 to 6½ minutes.

The batch was processed over a roll mill and a calender to form an 18″ wide by 120 mil thick sheet which was cooled and diced. The masterbatch had a density of 0.983 and a melt index of 2.8. The increase in melt index significantly shows that the polymeric component of the masterbatch has been changed to one of higher flow rate.

A film grade polyethylene resin was formed of 1.0 part of the above masterbatch with 99 parts of the same high clarity polyethylene used in the masterbatch. The same 3A Banbury mill was first charged with the polyethylene and the masterbatch composite. The total charge was brought to fluxing with slight water cooling under a ram pressure of 30 p.s.i. The masterbatch mix was fluxed into the polyethylene to a batch temperature of 118°–123° C. Total cycle time for fluxing was four minutes.

The polyethylene resin composition as prepared in the above manner was extruded into 1.5 mil tubular film, in 9.5 inch wide layflats using a 2.5″ m.p.m. extruder with a 4″ diameter tubular die at the rate of 34 pounds per hour and 49 feet per minute. The resin compound temperature at the die lip was 175° C. and the frostline was at 21 inches above the die. The total cooling zone was 90″ long.

The properties of the thusly prepared film are as follows:

(1) Blocking value—force in grams to separate a 4" x 5" sheet:
   After extrusion _____ 7.0
   After conditioning* _____ 37.8
(2) Kinetic coefficient of friction, after 24 hours___ 0.29
(3) Gloss × 10³_____ 139
(4) Haze percent**_____ 6
(5) See-through*** _____ 49

* Layflat extruded and conditioned for 24 hours at 60° C. between glass plates with 5 pounds weight applied to 6" x 5" samples.
** Haze values determined in a manner equivalent to ASTM method, D-1003-52.
*** See-through values determined by placing the film 1 foot from the viewer's eye and determining the greatest distance in feet at which the viewer could still read the small letter E in line 6 of a standard optic chart (A.M.A. Eye Chart).

*Example II*

In order to establish the merit of masterbatching techniques, two polyethylene compositions were made. One employed a masterbatch prepared in the manner identical to Example I except that the polyethylene in the masterbatch was a high clarity resin having a density of 0.918 and a melt index of about 2.0. One part of this masterbatch was incorporated into 99 parts of the same polyethylene resin in the masterbatch in the manner described in Example I.

An equivalent composition having the same percentage composition was prepared from 99.85 parts of the same polyethylene, 0.02 part of di-tert-butyl-p-cresol, 0.015 part oleamide, 0.015 of the 70:30 mixture of the amide of stearic acid and amide of palmitic acid, and 0.10 part of diatomaceous earth (Superfloss). They were all compounded in the same manner as the masterbatch sample, as described in Example I.

Each composition was extruded into 1.5 mil tubular film, 10" wide layflats using a 2.5" m.p.m. extruder with a 4" diameter tubular die at a rate of 20 pounds per hour and 28 feet per minute. Resin temperature at the die was 150° C. and the frostline at 3.5 inches above the die.

The physical properties of the extruded film were as follows:

| Composition Properties (tested before extrusion) | Master-batched | Single Compounding |
|---|---|---|
| 1. Total diffused light reflectance, percent color (ASTM Test, D-1003-52) | 75 | 70 |
| 2. G. E. spectrophotometer reading, percent reflectance: | | |
| 550 mμ (whiteness) | 69.4 | 62.1 |
| 550 minus 430 in mμ (yellowness) | 2.5 | 3.7 |

| Film Properties | Master-batched | Single Compounding |
|---|---|---|
| 1. Drawdown, feet per min | 120 | 95 |
| 2. Bag Drop impact, feet | 6.2 | 5.0 |
| 3. Haze, percent (as in Example I) | 11 | 13 |
| 4. Gloss × 10³ | 84 | 77 |
| 5. Kinetic coefficient of friction (after 24 hours) | 0.26 | 0.35 |
| 6. Blocking value, force grams to separate 4" x 5" area after conditioning (as described in Example I) | 22.6 | 30.4 |

The above results show that the film made from the masterbatch had better color (more white and less yellow), less blocking tendencies, lower kinetic coefficient of friction, and better optical properties. In addition, it had greater drawdown (38% more), and a higher film shock-impact strength. These results show a decided advantage for using a masterbatch composite of modifying agents as the means of introducing the agents into a base resin to form a compound. The agents introduced via a masterbatch were more effective in blocking resistance and slip (lower coefficient of friction) as compared to equal concentration of the agents added directly (dry) into the base resin forming a compound. Also, the masterbatch technique had less degrading effect on film optical properties as indicated by lower haze and higher gloss which is an important consideration when modifying a high clarity polyethylene film grade resin for blocking resistance. The masterbatch technique provides a means of achieving maximum blocking resistance without degrading optical properties of high clarity films. The unmodified high clarity films tend to block very readily as previously pointed out.

*Example III*

The polyethylene composition prepared by the masterbatching techniques of Example II was compared with a second composition as a control containing only 0.035 percent oleamide and 0.005 percent di-tert-butyl-p-cresol representing the best available control to determine the superior results of this invention.

The compounding was done in accordance with that method described in Example I. The following results were achieved:

| Compound properties | Masterbatch | Control |
|---|---|---|
| 1. Melt index | 2.43 | 2.47 |
| 2. Density | 0.917 | 0.916 |
| 3. Stiffness, 1% secant modulus, p.s.i.: | | |
| 0° C | 35,400 | 33,100 |
| 23° C | 21,400 | 19,700 |

These compounds were each extruded into 1.5 mil tubular film, 10" wide layflats as described in Example II. Film properties are as follows:

| | Masterbatch | Control |
|---|---|---|
| 1. Blocking at windup—visual | None | None |
| 2. Blocking after conditioning as in Example I, force in grams to separate 4" x 5" sheet | 22.6 | 62.3 |
| 3. Kinetic Coefficient of friction | 0.25 | 0.31 |
| 4. Haze Percent (as in Example I) | 11 | 12 |
| 5. Gloss×10³ | 84 | 83 |
| 6. See-through, feet (as described in Example I) | 22 | 22 |
| 7. Bag Drop Impact,¹ Feet | 6.2 | 5.0 |

¹ Average heights of drop before puncture of 5 bags 9½" wide by 19" long (machine direction of film) loaded with 10 pounds of sand.

*Example IV*

The same compositions, as prepared in Example III, were formed into 1.5 mil tubular film in 9.5" wide layflats using a 2.5" m.p.m. extruder with a 4" diameter tubular die at the rate of 34 pounds per hour at 44 feet per minute. The resin compound temperature at the die lips was 175° C. and the frostline was at 21 inches above the die. The total cooling zone was 90" long. The properties of the masterbatched example of this invention and of the control of Example III were as follows:

| Film Properties | Master-batched | Control |
|---|---|---|
| 1. At wind up, visual and hand inspection: | | |
| Slip | Fair | Fair |
| Blocking | Slight | Blocked |
| Film temperature at Nip, °F | 140 | 135 |
| 2. Blocking values, gms. force to separate 4" x 5" area as extruded | 16.7 | 42.4 |
| Conditioned (as in Ex. I) | 92.0 | 179.0 |
| 3. Kinetic Coefficient of friction | 0.26 | 0.40 |
| 4. Haze, Percent (as in Example I) | 7 | 8 |
| 5. Glass×10³ | 122 | 110 |
| 6. See-through, feet (as in Example I) | 36 | 41 |

*Example V*

A film prepared from the same composition but of a different production lot of the polyethylene base resin, as employed in Example IV, was extruded into a 1.5 mil tubular film in 12" wide layflats using a 2.5" m.p.m. extruder with a 4" diameter tubular die at a rate of 39 pounds per hour and at 47 f.p.m. Resin temperature at the die was 165° C. and the frostline at 18" above the die. Film properties, as compared to the control shown in Example IV, were as follows:

| Film Properties | Masterbatched | Control |
| --- | --- | --- |
| 1. Haze, percent | 7 | |
| 2. Gloss×10⁻³ | 112 | |
| 3. See-through, feet | 45 | |
| 4. Print adhesion Treatment (film aged one day): | | |
| Electrostatic | Excellent | Good. |
| Flame | do | Do. |
| 5. Kinetic Coefficient of friction: | | |
| Untreated | 0.26 | 0.39. |
| Electrostatic treated | 0.43 | 0.65. |
| Flame treated | 0.39 | 0.71. |
| 6. Roll storage, 1 week: | | |
| at 40° C | No blocking between layers or within layflat. | Film layers and layflat blocked. |
| at 60° C | Slight blocking between layers and within layflat. | Severely blocked between layers and within layflat. |

I claim:

1. A film-forming polyethylene composition containing in intimate dispersion in a polyethylene base resin an exudable unsaturated fatty acid amide polyethylene slip agent having a melting point between about 20° C. and 75° C., and a boiling point of at least 225° C. in an amount between about 0.001 to 0.15 part by weight; an exudable waxy fatty acid amide having a melting point between about 90° C. and 150° C., and a boiling point of at least 225° C. in an amount between about 0.001 to 0.15 part by weight; an antioxidant for polyethylene in amounts between about 0.001 to 1.0 part by weight; a finely divided siliceous matter in an amount between about 0.001 to 1.0 part by weight having an average particle size between about 0.5 to about 7 microns; a polyethylene having different melt flow characteristics than the base resin selected from the group consisting of polyethylenes having a melt index at least 10 percent higher than the melt index of the polyethylene base resin, polyethylenes having a higher density than the polyethylene base resin, and mixtures thereof in an amount between about 0.5 to 10 parts by weight and a film grade polyethylene base resin having a melt index between about 0.5 and 12 in an amount sufficient to make 100 parts by weight of said composition.

2. A polyethylene composition containing in intimate dispersion in a polyethylene base resin between about 0.001 and 0.15 part by weight of an amide of an unsaturated fatty acid containing from 16 to 24, inclusive, carbon atoms; between about 0.001 and 0.15 part by weight of an amide of a saturated fatty acid containing from 10 to 22, inclusive, carbon atoms; between about 0.001 to 1.0 part by weight of an antioxidant for the polyethylene; between about 0.01 to 0.5 part by weight of a finely divided siliceous material having an average particle size between about 0.5 to about 7 microns; between about 0.5 to 10.0 parts by weight of a polyethylene having different melt flow characteristics than the polyethylene base resin selected from the group consisting of polyethylenes having a melt index at least 10 percent higher than the melt index of the polyethylene base resin, polyethylenes having a higher density than the polyethylene base resin, and mixtures thereof, and a film grade polyethylene base resin having a melt index between about 0.5 and 12 in an amount to total 100 parts by weight of said composition.

3. A polyethylene composition containing in intimate dispersion in a polyethylene base resin between about 0.005 and 0.10 part by weight of an amide of an unsaturated fatty acid containing from 16 to 24, inclusive, carbon atoms; between about 0.005 to 0.10 part by weight of an amide of a saturated fatty acid containing from 10 to 22, inclusive, carbon atoms; between about 0.002 and 0.3 part by weight of an antioxidant for the polyethylene; between about 0.03 to 0.2 part by weight of a siliceous material having an average particle size between about 0.5 to 7.0 microns; between about 0.5 to 10.0 parts by weight of a polyethylene having different melt flow characteristics than the polyethylene base resin selected from the group consisting of polyethylenes having a melt index at least 10 percent higher than the melt index of the polyethylene base resin, polyethylenes having a higher density than the polyethylene base resin, and mixtures thereof, and a film grade polyethylene base resin having a melt index between about 0.5 and 12 in an amount to total 100 parts by weight of said composition.

4. A polyethylene film-forming composition characterized by having a haze value of less than 15 percent in thin self-sustaining films according to ASTM test method D-1003-52 containing in intimate dispersion in a polyethylene base resin between about 0.005 and 0.10 part by weight of an amide of an unsaturated fatty acid containing from 18 to 22, inclusive, carbon atoms; between about 0.005 and 0.10 part by weight of an amide of a saturated fatty acid containing from 16 to 22, inclusive, carbon atoms, with the total amount of said unsaturated fatty acid amide and the said saturated fatty acid amide not exceeding about 0.15 part by weight; between about 0.002 and 0.3 part by weight of an antioxidant for the polyethylene; between about 0.03 to 0.2 part by weight of a diatomaceous earth having an average particle size between about 0.5 to 7.0 microns; between about 1.0 to 5.0 parts by weight of a polyethylene resin having a melt index at least 10 percent higher than the melt index of the polyethylene base resin, and a polyethylene base resin having a melt index between about 0.5 to 12, and of an amount to total 100 parts by weight of said composition.

5. A polyethylene film forming composition characterized by having a haze value of less than 15 percent in thin self-sustaining films according to ASTM test method D-1003-52 containing in intimate dispersion in a polyethylene base resin between about 0.005 and 0.10 part by weight of oleamide, between about 0.005 to 0.10 part by weight of stearamide, between about 0.005 and 0.5 part by weight of di-tert-butyl-p-cresol, between about 0.03 to 0.2 part by weight of a diatomaceous earth having an average particle size between about 0.5 to 7.0 microns, between about 1.0 to 5.0 parts by weight of a polyethylene having a melt index at least 10 percent higher than the melt index of the polyethylene base resin, and sufficient polyethylene base resin having a melt index between about 0.5 to 12 to total 100 parts by weight of said film forming composition.

6. A thin self-sustaining polyethylene film characterized by having a high clarity and containing in intimate dispersion in a polyethylene base resin between about 0.001 and 0.15 part by weight of an amide of an unsaturated fatty acid containing from 16 to 24, inclusive, carbon atoms; between about 0.001 and 0.15 part by weight of an amide of a saturated fatty acid containing from 10 to 22, inclusive, carbon atoms; between about 0.001 to 1.0 part by weight of an antioxidant for the polyethylene; between about 0.01 to 0.5 part by weight of a finely divided siliceous material having an average particle size between about 0.5 to 7.0 microns; between about 0.5 to 10.0 parts by weight of a polymeric olefin having different melt flow characteristics than the polyethylene base resin selected from the group consisting of polyethylenes having a melt index at least 10 percent higher than the melt index of the polyethylene base resin, polyethylenes having a higher density than the polyethylene base resin, and mixtures thereof, and a film grade polyethylene base resin having a melt index between about 0.5 and 12 in an amount to total 100 parts by weight of said film.

7. A thin self-sustaining polyethylene film characterized by having a haze value of less than 15 percent according to ASTM test method D-1003-52 and containing in intimate dispersion in a polyethylene base resin between about 0.005 and 0.10 part by weight of an amide of an unsaturated fatty acid containing from 18 to 22, inclusive, carbon atoms; between 0.005 and 0.10 part by weight of an amide of a saturated fatty acid containing from 16 to 22, inclusive carbon atoms; between about 0.002 and 0.3 part by weight of an antioxidant for the polyethylene; between about 0.03 to 0.2 part by weight of a diatomaceous earth having an average particle size between about 0.5 to 7.0 microns; between about 1.0 to 5.0 parts by weight of a polymeric olefin having different melt flow characteristics than the polyethylene base resin selected from the group consisting of polyethylenes having a melt index at least 10 percent higher than the melt index of the polyethylene base resin, polyethylenes having a higher density than the polyethylene base resin, and mixtures thereof, and a film grade polyethylene base resin having a melt index between about 0.5 to 12 and in an amount to total 100 parts by weight of said film.

8. A thin self-sustaining polyethylene film characterized by having a haze value of less than 15 percent according to ASTM test method D–1003–52 and containing in intimate dispersion in a polyethylene base resin between about 0.005 and 0.10 part by weight of oleamide; between about 0.005 and 0.1 part by weight of stearamide; between 0.03 to 0.2 part by weight of a diatomaceous earth having an average particle size between about 0.5 to 7.0 microns; between about 0.002 to 0.3 part by weight of di-tert-butyl-p-cresol; between about 1.0 and 5.0 parts by weight of a polyethylene having a melt index at least 10 percent higher than the melt index of the polyethylene base resin, and sufficient polyethylene base resin having a melt index between about 0.5 to 12 to total 100 parts by weight of said film.

9. A thin self-sustaining polyethylene film characterized by having a haze value of less than 15 percent according to ASTM test method D–1003–52 and containing in intimate dispersion in a polyethylene base resin between about 0.005 and 0.10 part by weight of oleamide; between about 0.005 and 0.1 part by weight of stearamide; between 0.03 to 0.2 part by weight of a diatomaceous earth having an average particle size between about 0.5 to 7.0 microns; between about 0.002 to 0.3 part by weight of di-tert-butyl-p-cresol; between about 1.0 and 5.0 parts by weight of a polyethylene having a higher specific gravity than the polyethylene base resin, and sufficient polyethylene base resin having a melt index between about 0.5 to 12 to total 100 parts by weight of said film.

10. A thin self-sustaining polyethylene film of the composition of claim 4.

References Cited in the file of this patent

UNITED STATES PATENTS

| | | |
|---|---|---|
| 2,698,309 | Thwaites et al. | Dec. 28, 1954 |
| 2,770,609 | Symonds | Nov. 13, 1956 |

FOREIGN PATENTS

| | | |
|---|---|---|
| 701,468 | Great Britain | Dec. 23, 1953 |